United States Patent [19]

Moorhouse

[11] 4,311,338
[45] Jan. 19, 1982

[54] ARMREST ASSEMBLY FOR A SEAT

[75] Inventor: David Moorhouse, Blackthorn, England

[73] Assignee: UOP Inc., Des Plaines, Ill.

[21] Appl. No.: 84,923

[22] Filed: Oct. 15, 1979

[30] Foreign Application Priority Data

Nov. 1, 1978 [GB] United Kingdom ............... 42780/78

[51] Int. Cl.³ .............................................. A47C 7/54
[52] U.S. Cl. .................. 297/411; 248/281.1; 297/417
[58] Field of Search ............................. 297/411, 417; 248/281.1

[56] References Cited

U.S. PATENT DOCUMENTS 3,489,458  1/1970  Karlson .................................. 297/417
4,165,901  8/1979  Swenson ................................ 297/417

FOREIGN PATENT DOCUMENTS 580260  7/1969  France ................................ 297/411
746313  3/1956  United Kingdom ................ 297/417

Primary Examiner—James T. McCall
Attorney, Agent, or Firm—James R. Hoatson, Jr.; Barry L. Clark; William H. Page II

[57] ABSTRACT

An armrest assembly for a vehicle seat includes a parrallelogram-action support mechanism for permitting upward and downward movement of the armrest while maintaining the armrest horizontal. A toothed coupling is operable to lock the support mechanism at various selected heights of the armrest. An independently operable locking device releases the armrest for pivotal upward movement from its normal horizontal position.

4 Claims, 3 Drawing Figures

ARMREST ASSEMBLY FOR A SEAT

BACKGROUND OF THE INVENTION

This invention relates to an armrest assembly for a seat, in particular a vehicle seat. More particularly the invention relates to an assembly comprising an armrest and a supporting structure for supporting the armrest for movement upwardly and downwardly whilst maintaining the armrest horizontal and enabling it to be locked at a selected height. Vertically slidable supporting structures have previously been proposed but these are not readily adjustable for height for the seat occupant.

SUMMARY OF THE INVENTION

According to the present invention there is provided an armrest assembly for a seat comprising an armrest, a parallelogram-action support mechanism including a first support member for connection to the seat and a second support member connected to the armrest, the mechanism being operable to maintain the first and second support members at a constant inclination to each other so that when the armrest and mechanism are mounted for movement in a vertical plane, the armrest can be moved upwardly and downwardly while maintaining a constant inclination of said second support member to the horizontal, and a coupling manually operable to lock the support mechanism at any selected one of a plurality of different positions corresponding to different positions of the second support member relative to said first support member. In addition the armrest can be pivotally connected to the second support member to enable the armrest to be tilted upwardly from a normal position, releasable locking means being provided to lock said armrest in said normal position.

BRIEF DESCRIPTION OF THE DRAWINGS

The invention will now be particularly described with reference to the accompanying drawings in which.

DESCRIPTION OF THE PREFERRED EMBODIMENT

Figure 1:
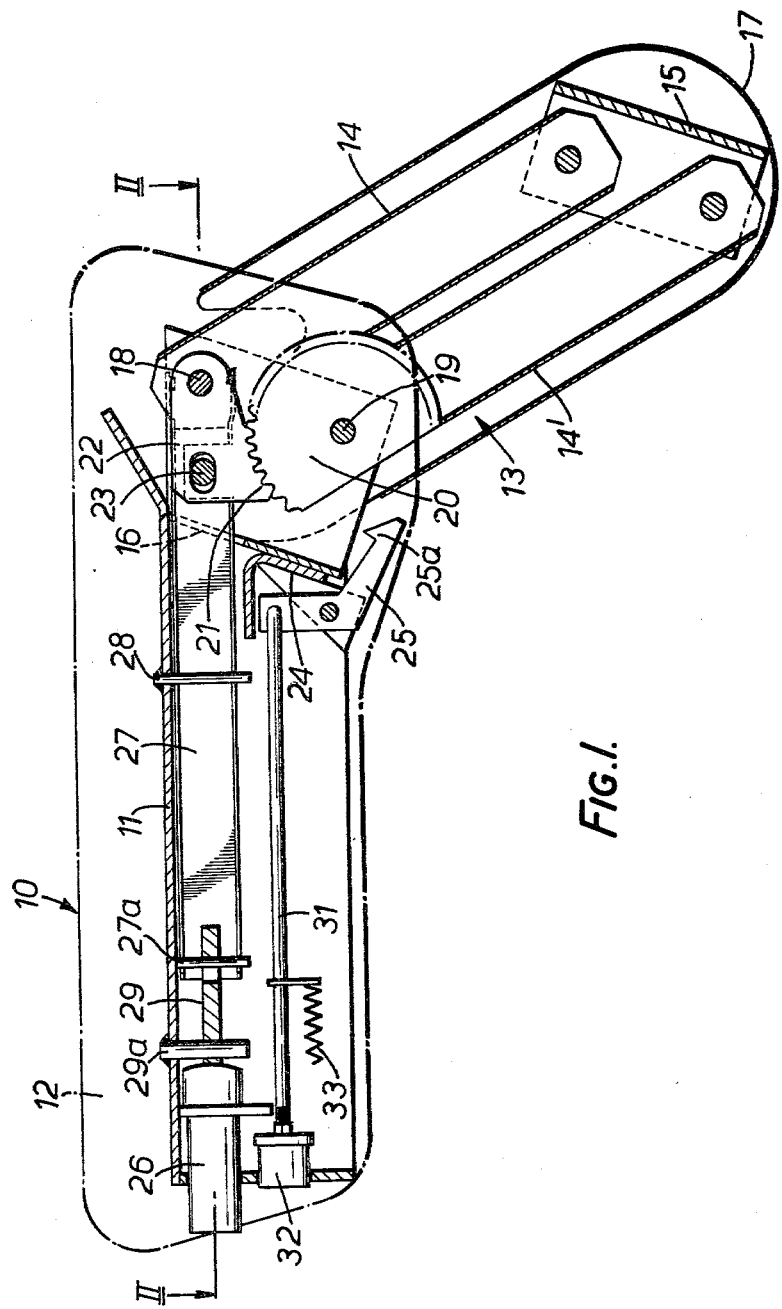
FIG. 1 is a vertical section through an armrest assembly for a vehicle seat.
Figure 2:
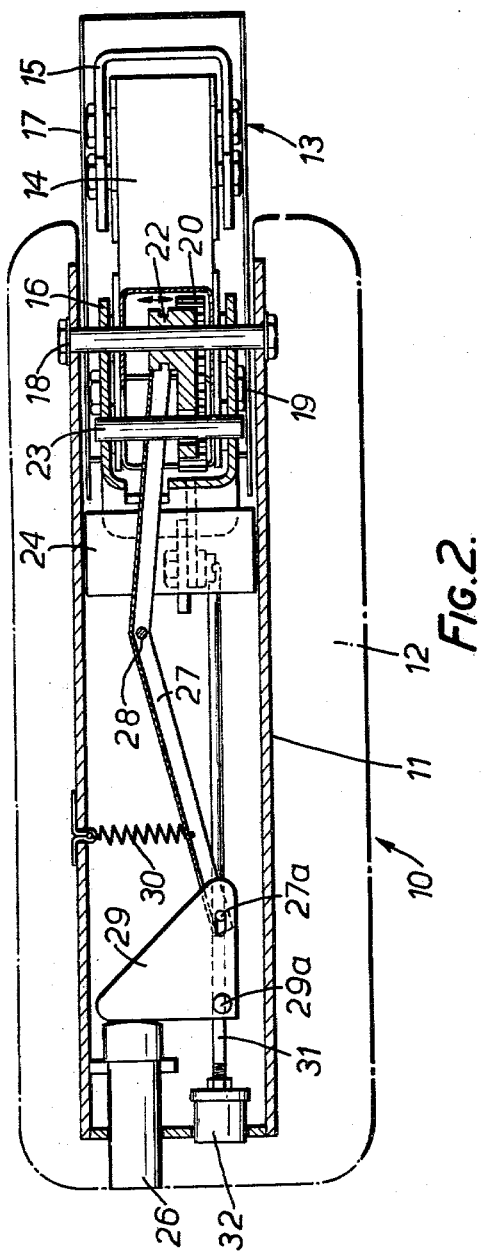
FIG. 2 is a section on the line II—II of FIG. 1.
Figure 3:
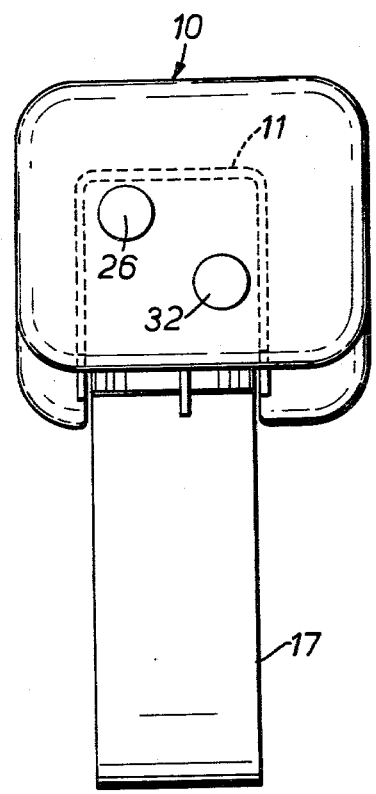
FIG. 3 is a front elevational view of the armrest assembly.

As shown in the drawings, the armrest assembly comprises an armrest 10 formed by an inverted trough-shaped frame 11 which carries suitably cushioned upholstery 12 and an armrest support structure 13 comprising two parallel support arms 14, 14' pivotally connected at one end to a first support bracket 15 to be mounted on the seat and pivotally connected at their opposite ends to a second support bracket 16 of U-shaped cross-section on which the armrest frame 11 is supported. The arms 14, 14' and bracket 15 are contained within a protective housing 17.

The connection of the second support bracket 16 to the support arm 14 comprises a pivot shaft 18 which also passes through the rearward end of the armrest frame 11. The support arm 14' pivotally engages the second support bracket 16 via a shaft 19. At this end, arm 14' carries a first toothed segment 20, conveniently in the form of part of a pinion, which engages a second toothed segment 21 shaped to complement the first toothed segment 20 and mounted on a slider 22 which is slidably mounted on the pivot shaft 18. A second shaft 23, parallel to the pivot shaft 18, passes through the slider 22 into engagement at its ends with the second support bracket 16. Accordingly, the U-shaped bracket 16 forms a parallelogram-structure with the two support arms 14, 14' and the first support bracket 15 and therefore is maintained in a constant relationship to the vertical as the support arms pivot upwardly or downwardly.

An armrest swing stop 24 mounted on the armrest frame 11 engages the forward surface of the U-shaped bracket 16 to support the armrest against downward movement relative to the bracket 16, and a locking catch 25 on the armrest frame is spring-biassed into locking engagement with the lower rear edge of said forward surface of the U-shaped bracket 16 to lock the armrest relative to the bracket 16, and hence to the support arms 14, 14' via the inter-engaging first and second toothed segments 20, 21. The catch 25 prevents upward pivotal movement of the frame 11 relative to the bracket 16 except for about 10° of movement which can take place before the hook portion 25a of catch 25 engages the bracket 16.

A mechanism for releasing the second toothed segment 21 from the first toothed segment 20 by movement of the slider 22 along the shafts 18, 23, comprises a system of levers operated from a first push button 26 at the forward end of the armrest. This system of levers comprises a bell crank lever 27 pivoted on a pivot pin 28 extending perpendicular to the length of the armrest frame 11 and disposed vertically when the frame 11 is horizontal, one end of the bell crank lever being pivotally and slidably connected to the slider 22. The opposite or forward end of the bell crank lever 27 has a pivot connection 27a adjacent one corner of a triangular plate 29 of which a second corner is supported by a pivot pin 29a on the frame 11, and the third corner is engaged by the first push button 26. Thus pressing on the push button against the force of a return spring 30 urges the slider 22 along shafts 18, 23 in a sense to separate the two toothed segments 20, 21.

The catch 25 for connecting the armrest releasably to the U-shaped bracket comprises a bell crank catch lever having a catch hook 25a at one end for engagement with the U-shaped bracket and is connected at its opposite end to a push rod 31 extending longitudinally through the armrest frame 11 to a second push button 32 slidably mounted at the forward end of the armrest below the first push button 26, and biassed by a spring 33 in a forward direction.

In operation, if the occupant of the seat wishes to raise or lower the armrest while maintaining it horizontal, he will press the first push button 26 to cause the bell crank lever 27 to pivot about its pivot pin 28 and urge the second toothed segment 21 laterally of the armrest out of engagement with the first toothed segment 20. Thereafter upward or downward pressure applied to the armrest will cause it to move upwardly or downwardly but the armrest will be maintained horizontal by operation of the parallelogram linkage 14, 14', 15, 16.

The bell crank lever 27 is biassed by the spring 30 to a position in which the two toothed segments 20, 21 engage one another so that upon release of the first push button 26, inter-engagement of the two toothed segments will again lock the parallelogram linkage and prevent further upward or downward movement of the armrest and holding the armrest at any one of a plurality of heights corresponding to those at which the toothed segments 20,21 engage each other. The teeth of two segments are so dimensioned as to permit locking of the armrest in any selected one of nine vertical positions to give nine discrete steps of movement of the armrest in the horizontal mode.

If, however, the occupant wishes to move the armrest pivotally about its pivot shaft 18, he will press the second push button 32 to release the locking catch 25 whereupon the armrest can be raised or lowered, the lowered position corresponding with that in which the swing stop engages the U-shaped bracket 16. The locking catch in its relation to the U-shaped bracket is such as to allow 10° of free swinging movement in an upward direction from the position shown in FIG. 1 to the position of the armrest in which hook 25a engages the U-shaped bracket 16. This enables the armrest to be aligned with the seat cushion when the armrest has been dropped to its lowest position in which it engages some form of stop on the cushion frame. The arrangement allows the armrest to be lowered to form a lateral extension of the seat cushion (for example for a child to sit on) and to remain in contact with the stop in the event that the seat cushion is tilted independently of the backrest through an angle within the 10° freedom of movement of the armrest.

In a modification of this embodiment, if pivotal upward and downward movement of the armrest is not required, the armrest can be formed integrally with the U-shaped bracket 16.

I claim:

1. A height-adjustable armrest assembly for a seat comprising an armrest, a support mechanism including a first support member for connection to the seat and a second support member connected to the rear end portion of the armrest, the support mechanism being a parallelogram-action mechanism which supports the armrest from its rear end portion as a cantilever and which permits relative movement between said support members while maintaining them at a said constant inclination to one another, and having a coupling manually operable to lock the support mechanism, and wherein the coupling comprises a first toothed coupling member movable with a first part of the parallelogram support mechanism and a second toothed coupling member forming an integral portion of a second part of the support mechanism, said first part and said first coupling member being movable relative to said second part and said second coupling member in response to relative movement between the first and second support members, and height-adjuster means for moving one of said coupling members out of locking engagement with the other of the coupling members so as to freely permit relative movement of said first and second support members to any one of a plurality of positions corresponding to a plurality of predetermined vertically-spaced, generally horizontal positions of the armrest.

2. An assembly according to claim 1 wherein said armrest is pivotally connected to said second support member to enable the armrest to be tilted upwardly from any one of its plurality of generally horizontal positions, releasable locking means being provided to normally limit the tilting movement of said armrest relative to said second support member.

3. An assembly according to claim 2 wherein said releasable locking means, while locked, permits a predetermined amount of pivotal movement of the armrest.

4. An assembly according to claim 1 wherein the first coupling member is slidably mounted on said second support member for movement along a line parallel to the pivot axes of the parallel action mechanism to bring said coupling members into and out of mutual engagement.

* * * * *